United States Patent [19]

Mark et al.

[11] 4,273,692

[45] Jun. 16, 1981

[54] POLYCARBONATE COMPOSITION CONTAINING HALOGEN-FREE ORGANOTIN PLASTICIZER

[75] Inventors: Victor Mark, Evansville, Ind.; Phillip S. Wilson, Louisville, Ky.

[73] Assignee: General Electric Company, Pittsfield, Mass.

[21] Appl. No.: 108,512

[22] Filed: Dec. 31, 1979

Related U.S. Application Data

[63] Continuation-in-part of Ser. No. 946,538, Sep. 28, 1978, abandoned.

[51] Int. Cl.$^3$ .......................... C08J 3/18; C08K 3/34
[52] U.S. Cl. .......................... 260/29.1 R; 260/31.8 R; 260/29.1 SB
[58] Field of Search .................. 260/29.1 R, 29.1 SB, 260/31.8 R

[56] References Cited

U.S. PATENT DOCUMENTS

| | | | |
|---|---|---|---|
| 2,592,926 | 4/1952 | Mack et al. | 260/30.8 R |
| 3,186,961 | 6/1965 | Sears | 260/30.8 R |
| 3,470,220 | 9/1969 | Moldritzer | 260/29.1 R |
| 3,483,159 | 12/1969 | Kauder | 260/31.8 R |
| 3,535,300 | 10/1970 | Gable | 260/29.1 R |
| 3,632,538 | 1/1972 | Kauder | 260/31.8 R |
| 4,138,379 | 2/1979 | Scott et al. | 260/29.1 R |

*Primary Examiner*—Joseph L. Schofer
*Assistant Examiner*—Peter F. Kulkosky

[57] ABSTRACT

A plasticized polycarbonate composition comprising an admixture of a high molecular weight aromatic polycarbonate and a plasticizing amount of an organotin plasticizer.

7 Claims, No Drawings

POLYCARBONATE COMPOSITION CONTAINING HALOGEN-FREE ORGANOTIN PLASTICIZER

This is a continuation-in-part application of copending application Ser. No. 946,538 filed Sept. 28, 1978 now abandoned.

This invention is directed to a plasticized polycarbonate composition comprising an admixture of a high molecular weight aromatic polycarbonate and a particular organotin plasticizer.

BACKGROUND OF THE INVENTION

Aromatic polycarbonates are excellent molding materials as products made therefrom have high impact strength, toughness, high transparency, wide temperature limits (high impact resistance below $-60°$ C. and a UL thermal endurance rating of $115°$ C. with impact), good dimensional stability, high creep resistance and electrical properties which qualify it as sole support for current carrying parts.

Polycarbonates are, however, very difficult to fabricate from melts since such melts have exceptionally high viscosities. Attempts to overcome this difficulty in polycarbonates employing materials known to reduce the viscosity of other resins have very generally been unsuccessful. Many standard viscosity control agents appear to have little or no effect on the viscosity of polycarbonate. Other compounds known to lower the viscosity of resins cause degradation of polycarbonate resins. Some compounds, conventionally employed to improve the workability of polymers, produce an embrittling effect when they are employed with polycarbonates which are subjected to elevated molding temperatures. Still other materials, while satisfactory stiffness modifying agents for other plastics, are too volatile to be incorporated with polycarbonates since polycarbonates have much higher melting points than many other thermoplastics.

DESCRIPTION OF THE INVENTION

It has been discovered that, by admixing a plasticizing amount of a particular organic organic plasticizer with a halogen-free, high molecular weight aromatic polycarbonate, the resultant polycarbonate composition has reduced melt viscosity and does not become brittle or degraded upon molding, thus retaining its characteristic high impact strength.

In the practice of this invention, the organotin plasticizers that can be employed are also halogen-free and are represented by the following general formulae:

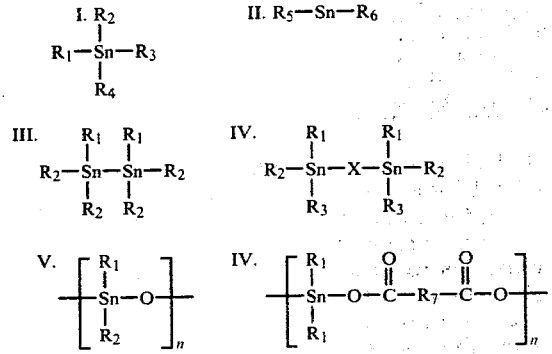

wherein $R_1$ and $R_2$ can independently be $C_1$ to $C_{20}$ alkyl, cycloalkyl of 4 to 14 carbon atoms, alkenyl of 2 to 20 carbon atoms, aryl, and substituted aryl of 6 to 14 carbon atoms wherein the substituents on said substituted aryl can be alkoxy of 1 to 20 carbon atoms, alkaryl of 7 to 36 carbon atoms, and aralkyl of 7 to 36 carbon atoms; $R_3$ and $R_4$ can independently be $C_1$ to $C_{20}$ alkyl, cycloalkyl of 4 to 14 carbon atoms, alkoxy of 1 to 20 carbon atoms, cycloalkoxy of 4 to 14 carbon atoms, aryloxy, and substituted aryloxy of 6 to 14 carbon atoms wherein the substituents on said substituted aryloxy can be alkyl of 1 to 20 carbon atoms, acyloxy of 1 to 30 carbon atoms including aliphatic, cycloaliphatic, aromatic and substituted aromatic radicals wherein the substituents on said substituted aromatic radicals can be alkyl of 1 to 20 carbon atoms; $R_5$ and $R_6$ can independently be acyloxy radicals of 1 to 30 carbon atoms including aliphatic, cycloaliphatic, aromatic and substituted aromatic radicals wherein the substituents on said substituted aromatic radicals can be an alkyl of 1 to 20 carbon atoms; $R_7$ is a divalent organic radical of 1 to 20 carbon atoms selected from the group consisting of alkylene, cycloalkylene, alkenylene, arylene, alkylidene and cycloalkylidene radicals; X is a divalent oxygen radical; and, n is an integer of 1 to 20.

These organotin plasticizers can be prepared by methods known in the art such as is described in Kirk-Othmer's *Encyclopedia of Chemical Technology*, second edition, 1969, Vol. 20, pp. 304–327, as well as in the references cited therein.

The amount of organotin plasticizer employed in the practice of this invention can be from about 0.005–1.0 parts per hundred parts of aromatic carbonate polymer, preferably from about 0.01–0.5 parts per hundred parts of aromatic carbonate polymer.

The high molecular weight aromatic polycarbonates that can be employed herein are homopolymers and copolymers and mixtures thereof which have an intrinsic viscosity (I.V.) of 0.40 to 1.0 dl/g as measured in methylene chloride at 25° C. and which can be prepared by reacting a dihydric phenol with a carbonate precursor. Typical of some of the dihydric phenols that can be employed are bisphenol-A, (2,2-bis(4-hydroxyphenyl)-propane), bis(4-hydroxyphenyl)methane, 2,2-bis(4-hydroxy-3-methylphenyl)propane and 4,4-bis(4-hydroxyphenyl)heptane. Other halogen-free dihydric phenols of the bisphenol type are also available and are disclosed in U.S. Pat. Nos. 2,999,835, 3,028,365 and 3,334,154.

Of course, it is possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. In addition, blends of any of these materials can also be employed to provide the aromatic carbonate polymer provided they are free of halogen.

The carbonate precursor can be either a carbonyl halide, a carbonate ester or a haloformate. The carbonyl halides which can be employed are carbonyl bromide, carbonyl chloride and mixtures thereof. Typical of the carbonate esters which can be employed are diphenyl carbonate, di-(halophenyl) carbonates such as di-(chlorophenyl) carbonate, di-(bromomphenyl) carbonate, di-(trichlorophenyl) carbonate, di-(tribromphenyl) carbonate, etc., di-(alkylphenyl) carbonates such as di(tolyl) carbonate, etc., di-(naphthyl) carbonate, di-(chloronaphthyl) carbonate, phenyl tolyl carbonate, chlorophenyl chloronaphthyl carbonate, etc. or mixtures thereof. Suitable haloformates include bishaloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

Also included are the polymeric derivatives of a dihydric phenol, a dicarboxylic acid and carbonic acid. These are disclosed in U.S. Pat. No. 3,169,121 which is incorporated herein by reference.

The aromatic polycarbonates of this invention can be prepared by employing a molecular weight regulator, an acid acceptor and a catalyst. The molecular weight regulators which can be employed include monohydric phenols such as phenol, chroman-I, paratertiarybutylphenol, parabromophenol, primary and secondary amines, etc. Preferably, phenol is employed as the molecular weight regulator.

A suitable acid acceptor can be either an organic or an inorganic acid acceptor. A suitable organic acid acceptor is a tertiary amine and includes such materials as pyridine, triethylamine, dimethylaniline, tributylamine, etc. The inorganic acid acceptor can be one which can be either a hydroxide, a carbonate, a bicarbonate, or a phosphate of an alkali or alkaline earth metal.

The catalysts which can be employed are any of the suitable catalysts that aid the polymerization of bisphenol-A with phosgene. Suitable catalysts include tertiary amines such as, for example, triethylamine, triporpylamine, N,N-dimethylaniline, quaternary ammonium compounds such as, for example tetraethylammonium bromide, cetyl triethyl ammonium bromide, tetra-n-heptylammonium iodide, tetra-n-propyl ammonium bromide, tetramethylammonium chloride, tetramethyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

Also, included herein are branched polycarbonates wherein a polyfunctional aromatic compound is reacted with the dihydric phenol and carbonate precursor to provide a thermoplastic randomly branched polycarbonate.

These polyfunctional aromatic compounds contain at least three functional groups which are carboxyl, carboxylic anhydride, or mixtures thereof. Examples of these polyfunctional aromatic compounds which can be employed include trimellitic anhydride, trimellitic acid, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred polyfunctional aromatic compounds are trimellitic anhydride or trimellitic acid.

Also, included herein are blends of a linear polycarbonate and a branched polycarbonate.

The polycarbonate composition of the invention is prepared by blending the high molecular weight aromatic polycarbonate with the organotin plasticizer by employing conventional methods.

PREFERRED EMBODIMENT OF THE INVENTION

The following examples are set forth to more fully describe the invention. Accordingly, the examples should be construed as being illustrative and not limitative of the invention. In the examples, all parts and percentages are on a weight basis unless otherwise specified.

EXAMPLE 1

One hundred (100) parts of an aromatic, halogen-free polycarbonate prepared from 2,2-bis(4-hydroxyphenyl)propane (bisphenol-A) and phosgene in the presence of an acid acceptor and a molecular weight regulator and having an intrinsic viscosity of about 0.57, was mixed with the plasticizer listed in the Table by tumbling the ingredients together in a laboratory tumbler. The resulting mixture was then fed to an extruder which was operated at about 265° C., and the extrudate was comminuted into pellets.

The pellets were then fed into a plasticizer and the flow rate of the polymer was measured according to ASTM D1238-70, Condition O. The melt flow rate is set forth in the Table.

Additionally, the pellets were injection molded at about 315° C. into test specimens of about 5 by ½ by ⅛ inch thick. The impact strength of these specimens was then measured according to the Izod test, ASTM D256 and the results obtained are also set forth in the Table. The sample labeled CONTROL is the polycarbonate prepared without plasticizer.

TABLE

| Organotin Plasticizer | Amount (pph) | Melt Flow Rate (gr./10 min.) | Impact Strength (Ft. Lbs./In.) |
|---|---|---|---|
| CONTROL | — | 10.10 | 16.2 |
| Tetradodecylstannane | .1 | 14.6 | 16.3 |
| Triphenyl(1-oxododecyloxy)-stannane | .01 | 38.0 | 12.6 |
| Tripropyl(1-oxododecyloxy)-stannane | .01 | 40.0 | 11.8 |
| Di(1-oxo-hexadecyloxy)-stannane | .1 | 11.9 | 16.2 |
| Di(1-oxo-hexadecyloxy)-stannane | .3 | 17.5 | 15.1 |
| Di(1-oxo-octyloxy)stannane | .5 | 30.2 | 12.6 |
| Hexabutyldistannoxane | .01 | 34.0 | 12.4 |
| Didodecyldibutoxystannane | .01 | 33.0 | 12.4 |
| Poly[oxy(dibutylstannylene)-oxy(1,4-dioxo-2-butene-1,4-diyl] | .02 | 38.3 | 11.8 |
| Dibutylbis(1-oxododecyloxy)-stannane | .01 | 27.0 | 12.8 |
| Dibutylbis(2-ethyl-1-oxohexyloxy)stannane | .01 | 28.2 | 14.6 |
| Dibutyldibutoxystannane | .01 | 35.8 | 13.1 |
| Hexaphenyldistannane | .03 | 19.7 | 14.7 |
| Hexaphenyldistannane | .1 | 24.0 | 13.3 |
| Hexaphenyldistannane | .2 | 29.2 | 13.3 |

It can be seen from the data in the Table that when the halogen-free organotin plasticizers of the invention are added to a halogen-free high molecular weight aromatic polycarbonate, the resulting polycarbonate composition has reduced melt viscosity as shown by the higher melt flow rate while retaining impact strength.

What is claimed is:

1. A halogen-free plasticized polycarbonate composition comprising an admixture of a high molecular weight aromatic polycarbonate and a plasticizing amount of a halogen-free organotin plasticizer represented by the following general formulae:

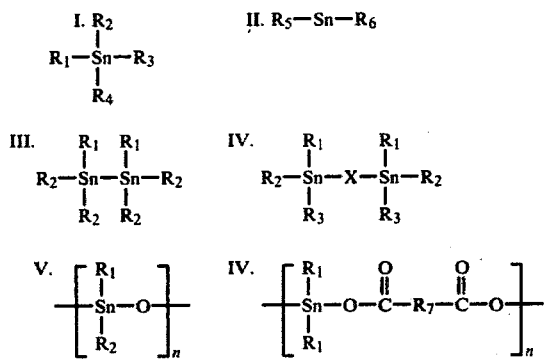

wherein $R_1$ and $R_2$ can independently be $C_1$ to $C_{20}$ alkyl, cycloalkyl of 4 to 14 carbon atoms, alkenyl of 2 to 20 carbon atoms, aryl, and substituted aryl of 6 to 14 carbon atoms wherein the substituents on said substituted aryl can be alkoxy of 1 to 20 carbon atoms, alkaryl of 7 to 36 carbon atoms, and aralkyl of 7 to 36 carbon atoms; $R_3$ and $R_4$ can independently be $C_1$ to $C_{20}$ alkyl, cycloalkyl of 4 to 14 carbon atoms, alkoxy of 1 to 20 carbon atoms, cycloalkoxy of 4 to 14 carbon atoms, aryloxy, and substituted aryloxy of 6 to 14 carbon atoms wherein the substituents on said substituted aryloxy can be alkyl of 1 to 20 carbon atoms, acyloxy of 1 to 30 carbon atoms including aliphatic, cycloaliphatic, aromatic and substituted aromatic radicals wherein the substituents on said substituted aromatic radicals can be alkyl of 1 to 20 carbon atoms; $R_5$ and $R_6$ can independently be acyloxy radicals of 1 to 30 carbon atoms including aliphatic, cycloaliphatic, aromatic and substituted aromatic radicals wherein the substituents on said substituted aromatic radicals can be alkyl of 1 to 20 carbon atoms; $R_7$ is a divalent organic radical of 1 to 20 carbon atoms selected from the group consisting of alkylene, cycloalkylene, alkenylene, arylene, alkylidene and cycloalkylidene radicals; X is a divalent oxygen radical; and, n is an integer of 1 to 20.

2. The composition of claim 1 wherein said plasticizer is present in an amount of from about 0.005–1.0 parts per hundred parts of said aromatic polycarbonate.

3. The composition of claim 1 wherein said aromatic polycarbonate is derived from bisphenol-A.

4. The composition of claim 1 wherein said plasticizer is dibutylbis(1-oxododecyloxy)stannane.

5. The composition of claim 1 wherein said plasticizer is poly[oxy(dibutylstannylene)oxy(1,4-dioxo-2-butene-1,4-diyl)].

6. The composition of claim 1 wherein said plasticizer is hexabutyldistannoxane.

7. The composition of claim 1 wherein said plasticizer is di(1-oxo-hexadecyloxy)stannane.

* * * * *